United States Patent
Fujii et al.

(10) Patent No.: US 10,283,269 B2
(45) Date of Patent: May 7, 2019

(54) MULTILAYER CERAMIC CAPACITOR AND MULTILAYER CERAMIC CAPACITOR MOUNT STRUCTURE

(71) Applicant: Murata Manufacturing Co., Ltd., Nagaokakyo-shi, Kyoto-fu (JP)

(72) Inventors: Yasuo Fujii, Nagaokakyo (JP); Yohei Mukobata, Nagaokakyo (JP); Kotaro Kishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/785,694

(22) Filed: Oct. 17, 2017

(65) Prior Publication Data

US 2018/0108480 A1    Apr. 19, 2018

(30) Foreign Application Priority Data

Oct. 17, 2016 (JP) ................... 2016-203278

(51) Int. Cl.
| | |
|---|---|
| *H01G 4/232* | (2006.01) |
| *H01G 4/30* | (2006.01) |
| *H01G 4/002* | (2006.01) |
| *H01G 4/008* | (2006.01) |
| *H01G 4/012* | (2006.01) |

(Continued)

(52) U.S. Cl.
CPC ............ *H01G 4/232* (2013.01); *H01G 4/002* (2013.01); *H01G 4/008* (2013.01); *H01G 4/012* (2013.01); *H01G 4/1227* (2013.01); *H01G 4/1236* (2013.01); *H01G 4/30* (2013.01); *H01G 4/248* (2013.01)

(58) Field of Classification Search
CPC ........ H01G 4/232; H01G 4/002; H01G 4/008; H01G 4/012; H01G 4/1227; H01G 4/1236; H01G 4/30; H01G 4/248
See application file for complete search history.

(56) References Cited

U.S. PATENT DOCUMENTS

| | | | | |
|---|---|---|---|---|
| 2003/0011962 A1* | 1/2003 | Yamamoto | ............. | H01G 4/232 |
| | | | | 361/321.2 |
| 2009/0207550 A1* | 8/2009 | Feichtinger | .............. | H01G 4/30 |
| | | | | 361/301.4 |

(Continued)

FOREIGN PATENT DOCUMENTS

JP              2013-41886 A      2/2013

*Primary Examiner* — Dion Ferguson
(74) *Attorney, Agent, or Firm* — Keating & Bennett, LLP

(57) ABSTRACT

A multilayer ceramic capacitor satisfies L≤about 1.4 mm, about 1.1≤L/W≤about 1.6, e≥about 0.10 mm, i/L>about 0.40 and i/g>about 2. L and W are maximum outer dimensions in length and width directions, e is a length direction distance along which a first or second end surface outer electrode located on a first side surface extends or along which the first or second end surface outer electrode located on a second side surface extends, g is a smallest distance among length direction distances between the first end surface outer electrode and a first or second side surface outer electrode and between the second end surface outer electrode and the first or second side surface outer electrode, and i is a distance on the side where g is among distances in the length direction along which the first and second side surface outer electrodes extend.

18 Claims, 5 Drawing Sheets

(51) Int. Cl.
*H01G 4/12* (2006.01)
*H01G 4/248* (2006.01)

(56) References Cited

U.S. PATENT DOCUMENTS

| | | | |
|---|---|---|---|
| 2011/0205684 A1* | 8/2011 | Yamamoto | H01G 4/232 |
| | | | 361/305 |
| 2013/0242457 A1* | 9/2013 | Lee | H01G 4/008 |
| | | | 361/301.4 |
| 2015/0109718 A1* | 4/2015 | Choi | H01G 2/06 |
| | | | 361/304 |
| 2015/0115893 A1* | 4/2015 | Lee | H01G 4/30 |
| | | | 320/135 |
| 2016/0049243 A1* | 2/2016 | Uno | H01G 4/012 |
| | | | 361/303 |
| 2016/0293332 A1* | 10/2016 | Kato | H01G 4/30 |

\* cited by examiner

SECTIONAL VIEW TAKEN ALONG II-II

SECTIONAL VIEW TAKEN ALONG III-III

MULTILAYER CERAMIC CAPACITOR AND MULTILAYER CERAMIC CAPACITOR MOUNT STRUCTURE

CROSS REFERENCE TO RELATED APPLICATIONS

This application claims the benefit of priority to Japanese Patent Application No. 2016-203278 filed on Oct. 17, 2016. The entire contents of this application are hereby incorporated herein by reference.

BACKGROUND OF THE INVENTION

1. Field of the Invention

The present invention relates to a multilayer ceramic capacitor and a multilayer ceramic capacitor mount structure, and in particular, to a three-terminal-type multilayer ceramic capacitor and a three-terminal-type multilayer ceramic capacitor mount structure.

2. Description of the Related Art

Recently, together with the continuing decrease in the size and the continuing increase in the capacitance of electronic products, there have been demands for further decreases in the size and further increases in the capacitance of multilayer ceramic capacitors used in such electronic products. In addition, multilayer ceramic capacitors having a small equivalent series inductance (ESL) are required due to a trend of electronic products having increasingly high frequencies, increasingly low voltages, and increasingly low power consumptions, and a three-terminal-type multilayer ceramic capacitor is known as an example of such a multilayer ceramic capacitor having a small ESL (refer to Japanese Unexamined Patent Application Publication No. 2013-41886, for example).

Such a three-terminal-type multilayer ceramic capacitor is formed of a capacitor element body (multilayer body), signal terminal electrodes (end surface outer electrodes) that are located on both end surfaces of the capacitor element body, and ground terminal electrodes (side surface outer electrodes) that are located on both side surfaces of the capacitor element body. Signal inner electrodes that extend to both end surfaces of the capacitor element body, and ground inner electrodes that extend to both side surfaces of the capacitor element body are stacked in an alternating manner inside the capacitor element body. In this three-terminal-type multilayer ceramic capacitor, the path along which a current flows is made shorter by decreasing the distance between the outer electrodes and consequently the inductance of the capacitor is decreased. There are no particular stipulations regarding the widths of the ground terminal electrodes, or regarding the widths of the signal terminal electrodes located on both main surfaces and both side surfaces of the ceramic element body, for example.

However, among such three-terminal-type multilayer ceramic capacitors, a three-terminal-type multilayer ceramic capacitor having an even lower equivalent series inductance (ESL) is demanded depending on the use specifications.

Furthermore, regarding such three-terminal-type multilayer ceramic capacitors, a three-terminal-type multilayer ceramic capacitor that is stable when mounted on a mounting substrate, and a mount structure are also demanded due to the fact that the widths of the ground terminal electrodes and the widths of the signal terminal electrodes that are located on both main surfaces and both side surfaces of the ceramic element body affect the force with which the three-terminal-type multilayer ceramic capacitor is fixed to a mounting substrate.

SUMMARY OF THE INVENTION

Preferred embodiments of the present invention provide multilayer ceramic capacitors having a low equivalent series inductance (ESL), and multilayer ceramic capacitor mount structures in each of which a prescribed multilayer ceramic capacitor is able to be stably mounted on a mounting substrate.

A multilayer ceramic capacitor according to a preferred embodiment of the present invention includes a multilayer body that includes a plurality of dielectric layers and a plurality of inner electrodes that are stacked on top of one another, that includes a first main surface and a second main surface that face each other in a stacking direction of the multilayer body, a first end surface and a second end surface that face each other in a length direction of the multilayer body that is orthogonal or substantially orthogonal to the stacking direction, and a first side surface and a second side surface that face each other in a width direction of the multilayer body that is orthogonal or substantially orthogonal to the stacking direction and the length direction of the multilayer body; a first end surface outer electrode that is located on the first end surface, and extends from the first end surface and cover a portion of each of the first main surface, the second main surface, the first side surface and the second side surface; a second end surface outer electrode that is located on the second end surface, and extends from the second end surface and cover a portion of each of the first main surface, the second main surface, the first side surface and the second side surface; a first side surface outer electrode that is located on the first side surface, and extends from the first side surface and cover a portion of each of the first main surface and the second main surface; and a second side surface outer electrode that is located on the second side surface, and extends from the second side surface and cover a portion of each of the first main surface and the second main surface. The plurality of inner electrodes includes a plurality of first inner electrodes and a plurality of second inner electrodes. The plurality of first inner electrodes and the plurality of second inner electrodes are disposed in the multilayer body so as to be arranged in an alternating manner in the stacking direction of the multilayer body. The first inner electrodes each include a first facing electrode portion that faces the second inner electrodes, a first extending electrode portion that is electrically connected to the first end surface outer electrode and extends to the first end surface of the multilayer body from the first facing electrode portion, and a second extending electrode portion that is electrically connected to the second end surface outer electrode and extends to the second end surface of the multilayer body from the first facing electrode portion. The second inner electrodes each include a second facing electrode portion that faces the first inner electrodes, a third extending electrode portion that is electrically connected to the first side surface outer electrode and extends to the first side surface of the multilayer body from the second facing electrode portion, and a fourth extending electrode portion that is electrically connected to the second side surface outer electrode and extends to the second side surface of the multilayer body from the second facing electrode portion. When L is a maximum outer dimension of the multilayer ceramic capacitor in the length direction, W is a maximum outer dimension of the multilayer ceramic capacitor in the width direction, e is a distance in the length direction along which the first end surface outer electrode or second end surface outer electrode located on the first side surface extends, or a distance in the length direction along which the first end surface outer electrode or second end surface outer electrode located on the second side surface extends, g is a smallest distance out of a distance in the length direction between the first end surface outer electrode and the first side surface outer electrode located on the first side surface, a distance in the length direction between the second end surface outer electrode and the first side surface outer electrode located on the first side surface, a distance in the length direction between the first end surface outer electrode and the second side surface outer electrode located on the second side surface, and a distance in the length direction between the second end surface outer electrode and the second side surface outer electrode located on the second side surface, and i is a distance on the side where the g is located out of a distance in the length direction along which the first side surface outer electrode located on the first side surface extends and a distance in the length direction along which the second side surface outer electrode located on the second side surface extends, L≤1.4 mm, 1.1≤L/W≤1.6, e≥0.10 mm, i/L>0.40, and i/g>2 are satisfied.

In addition, in a multilayer ceramic capacitor according to a preferred embodiment of the present invention, a thickness in the stacking direction of each of outer layer portions of the multilayer body that are located at the first main surface side and the second main surface side of the multilayer body and are defined by the dielectric layer that is located between the first main surface and the inner electrode that is closest to the first main surface, and the dielectric layer that is located between the second main surface and the inner electrode that is closest to the second main surface is preferably about 60 µm or less.

In addition, in a multilayer ceramic capacitor according to a preferred embodiment of the present invention, lengths of side portions of the multilayer body that are disposed between one end of the first facing electrode portion of each first inner electrode in the width direction and the first side surface and between the other end of the first facing electrode portion in the width direction and the second side surface and of side portions of the multilayer body that are disposed between one end of the second facing electrode portion of each second inner electrode in the width direction and the first side surface, and between the other end of the second facing electrode portion in the width direction and the second side surface are preferably about 80 µm or less.

Furthermore, in a multilayer ceramic capacitor according to a preferred embodiment of the present invention, when i is a distance on the side where the g is located out of a distance in the length direction of the multilayer body along which the first side surface outer electrode located on the first side surface of the multilayer body extends and a distance in the length direction of the multilayer body along which the second side surface outer electrode located on the second side surface of the multilayer body extends, and "a" is a distance on the side where the distance i is located out of a distance in the length direction of the multilayer body along which a leading end of the third extending electrode portion of the second inner electrode extends and a distance in the length direction of the multilayer body along which a leading end of the fourth extending electrode portion of the second inner electrode extends, i−a≤about 0.3 mm is preferably satisfied.

A multilayer ceramic capacitor mount structure according to a preferred embodiment of the present invention includes the multilayer ceramic capacitor according to a preferred embodiment of the present invention; and a mounting substrate on which the multilayer ceramic capacitor is mounted using a bonding material. The mounting substrate includes a base portion including a main surface, a first land and a second land that are located on the main surface of the base portion so as to be spaced apart from each other, and a third land and a fourth land that are located between the first land and the second land on the main surface of the base portion so as to be spaced apart from each other in a direction that is orthogonal or substantially orthogonal to a direction that connects the first land and the second land. When A is a distance from an end portion of the first land on the opposite side from a side where the second land is located to an end portion of the second land on the opposite side from a side where the first land is located, B is a distance between the third land and the fourth land, and C is a distance from an end portion of the third land on the opposite side from a side where the fourth land is located to an end portion of the fourth land on the opposite side from a side where the third land is located, A is about 1.4 mm to about 1.6 mm, B is about 0.3 mm to about 0.4 mm, and C is about 0.95 mm to about 1.1 mm.

According to a multilayer ceramic capacitor of a preferred embodiment of the present invention, when L is the maximum outer dimension of the multilayer ceramic capacitor in the length direction, W is the maximum outer dimension of the multilayer ceramic capacitor in the width direction, e is the distance in the length direction along which the first end surface outer electrode or the second end surface outer electrode located on the first side surface extends or the distance in the length direction along which the first end surface outer electrode or the second end surface outer electrode located on the second side surface extends, g is the smallest distance out of a distance in the length direction between the first end surface outer electrode and the first side surface outer electrode located on the first side surface, a distance in the length direction between the second end surface outer electrode and the first side surface outer electrode located on the first side surface, a distance in the length direction between the first end surface outer electrode and the second side surface outer electrode located on the second side surface, and a distance in the length direction between the second end surface outer electrode and the second side surface outer electrode located on the second side surface, and i is the distance on the side where the g is located out of a distance in the length direction along which the first side surface outer electrode located on the first side surface extends and a distance in the length direction along which the second side surface outer electrode located on the second side surface extends, the conditions:

L≤about 1.4 mm,
about 1.1≤L/W≤about 1.6,
e≥about 0.10 mm,
i/L>about 0.40, and
i/g>about 2 are satisfied, and therefore, a multilayer ceramic capacitor having a low ESL is obtained.

In addition, according to a multilayer ceramic capacitor of a preferred embodiment of the present invention, when a thickness in the stacking direction of each of outer layer portions that are located at the first main surface side and the second main surface side of the multilayer body and defined by the dielectric layer that is located between the first main surface and the inner electrode that is closest to the first main surface, and the dielectric layer that is located between the second main surface and the inner electrode that is closest to the second main surface is about 60 µm or less, a multilayer ceramic capacitor having a low ESL is obtained with certainty.

In addition, according to a multilayer ceramic capacitor of a preferred embodiment of the present invention, when lengths in the width direction of side portions of the multilayer body that are disposed between one end of the first facing electrode portion of each first inner electrode in the width direction and the first side surface and between the other end of the first facing electrode portion in the width direction and the second side surface and of side portions of the multilayer body that are disposed between one end of the second facing electrode portion of each second inner electrode in the width direction and the first side surface, and between the other end of the second facing electrode portion in the width direction and the second side surface are about 80 µm or less, the distance along which a current flows is made smaller, and therefore, a multilayer ceramic capacitor having a low ESL is obtained.

Furthermore, according to multilayer ceramic capacitors of various preferred embodiments of the present invention, when the condition i–a ≤about 0.3 mm is satisfied between i that is the distance on the side where the g is located out of the distance in the length direction along which the first side surface outer electrode located on the first side surface extends and the distance in the length direction along which the second side surface outer electrode located on the second side surface extends, and a that is the distance on the side where the i is located out of the distance in the length direction along which the leading end of the third extending electrode portion of the second inner electrode extends and the distance in the length direction along which the fourth extending electrode portion of the second inner electrode extends, a multilayer ceramic capacitor having a low ESL is obtained.

According to a multilayer ceramic capacitor mount structure of a preferred embodiment of the present invention, among the first land, the second land, the third land and the fourth land located on the main surface of the base portion of the mounting substrate including the base portion, when the first land and the second land are located on the main surface of the base portion so as to be spaced apart from each other, and the third land and the fourth land are located between the first land and the second land on the main surface of the base portion so as to be spaced apart from each other and when A is the distance from the end portion of the first land on the opposite side from the side where the second land is located to the end portion of the second land on the opposite side from the side where the first land is located, B is the distance between the third land and the fourth land, and C is the distance from the end portion of the third land on the opposite side from the side where the fourth land is located to the end portion of the fourth land on the opposite side from the side where the third land is located, A is about 1.4 mm to about 1.6 mm, B is about 0.3 µm to about 0.4 mm, and C is about 0.95 mm to about 1.1 mm, and therefore, the fixing force in the case where the multilayer ceramic capacitor is mounted on the mounting substrate is improved due to the respective distances being set by taking into consideration the size of the multilayer ceramic capacitor according to a preferred embodiment of the present invention, and therefore, an effect is obtained that the stability is improved when mounting the multilayer ceramic capacitor.

According to various preferred embodiments of the present invention, multilayer ceramic capacitors having a low equivalent series inductance (ESL) are provided.

In addition, according to various preferred embodiments of the present invention, multilayer ceramic capacitor mount structures are provided in each of which a prescribed multilayer ceramic capacitor is able to be stably mounted on a mounting substrate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitors (three-terminal-type multilayer ceramic capacitor) according to preferred embodiments of the present invention will be described with reference to the drawings.

Figure 1:
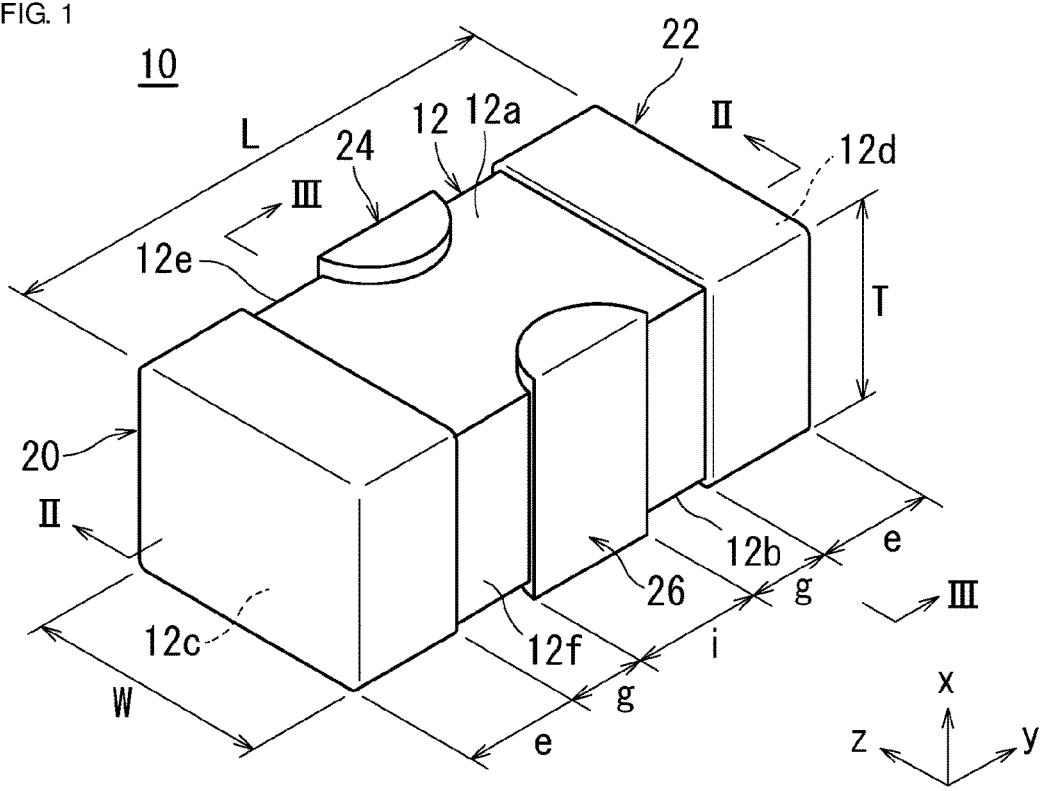
FIG. 1 is an external perspective view illustrating an example of the configuration of a multilayer ceramic capacitor (three-terminal-type multilayer ceramic capacitor) according to a preferred embodiment of the present invention.
Figure 2:
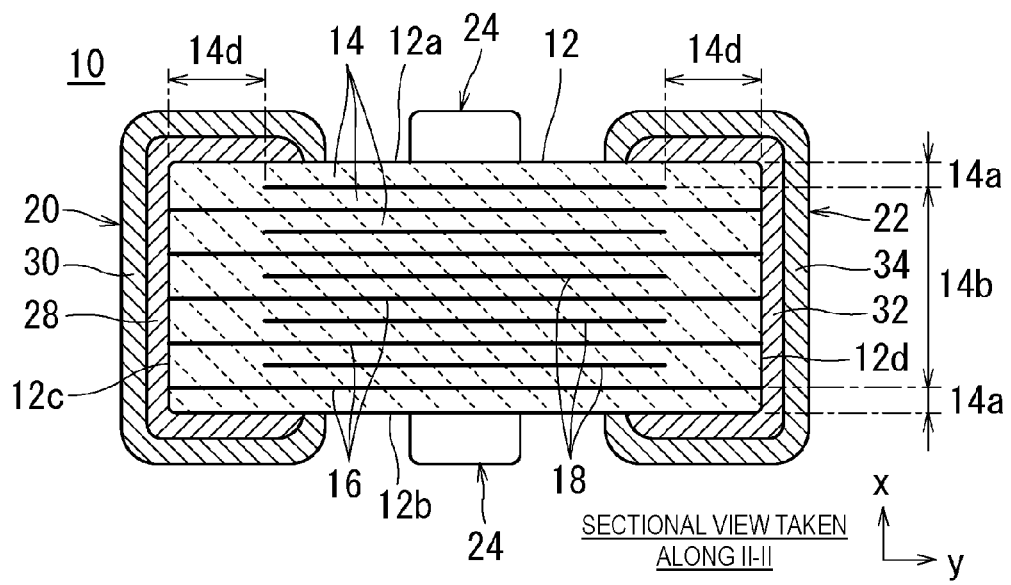
FIG. 2 is a sectional view taken along line II-II in FIG. 1.
Figure 3:
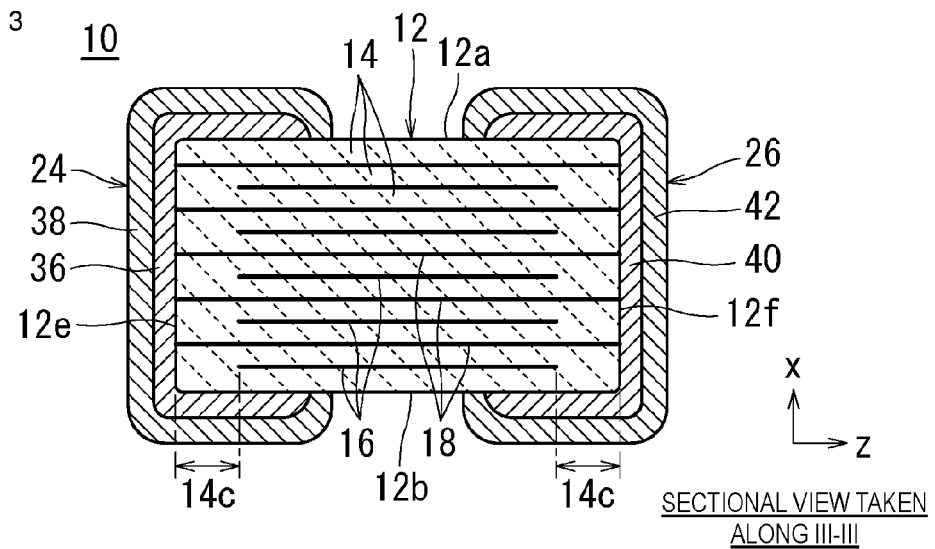
FIG. 3 is a sectional view taken along line III-III in FIG. 1.
Figure 4A:
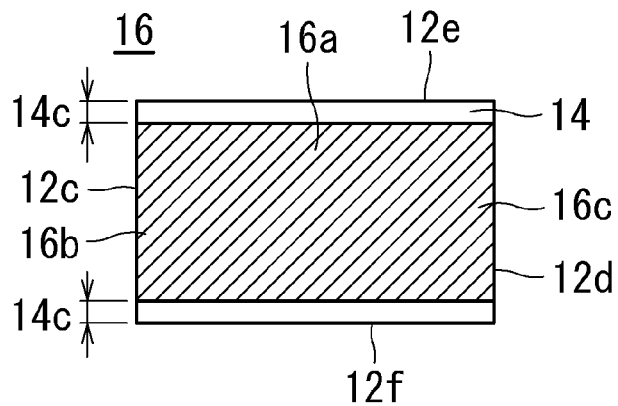
FIG. 4A illustrates a first inner electrode of the multilayer ceramic capacitor (three-terminal-type multilayer ceramic capacitor) in FIG. 1.
Figure 4B:
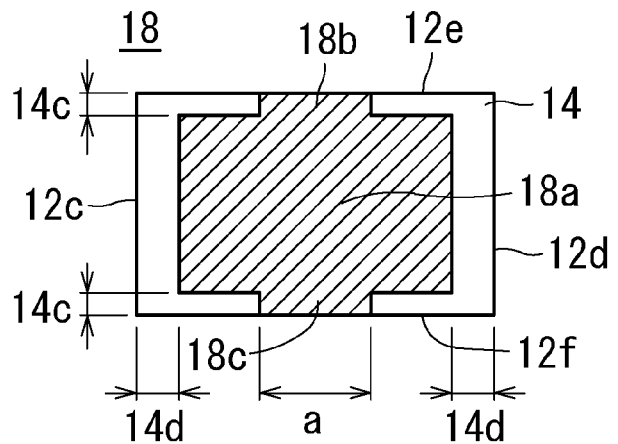
FIG. 4B illustrates a second inner electrode of the multilayer ceramic capacitor in FIG. 1.

FIG. 1 is an external perspective view illustrating an example of a multilayer ceramic capacitor according to a preferred embodiment of the present invention. FIG. 2 is a sectional view taken along line II-II in FIG. 1, and FIG. 3 is a sectional view taken along line III-III in FIG. 1. FIG. 4A illustrates a first inner electrode of the multilayer ceramic capacitor illustrated in FIG. 1, and FIG. 4B illustrates a second inner electrode of the multilayer ceramic capacitor illustrated in FIG. 1.

As illustrated in FIGS. 1, 2 and 3, a multilayer ceramic capacitor 10 includes a rectangular or substantially rectangular parallelepiped shaped multilayer body 12, for example.

The multilayer body 12 includes a plurality of dielectric layers 14 and a plurality of inner electrodes 16 that are stacked on top of one another.

In this case, a direction in which the dielectric layers 14 of the multilayer body 12 are stacked on top of one another is defined as a stacking direction x, a direction that connects a first side surface outer electrode 24 and a second side surface outer electrode 26 of the multilayer ceramic capacitor 10 that will be described later among directions orthogonal or substantially orthogonal to the stacking direction x is defined as a length direction y of the multilayer body 12, and a direction that is orthogonal or substantially orthogonal to both the stacking direction x and the length direction y is defined as a width direction z of the multilayer body 12.

These terms will be used in the following description. These terms will also be used later to describe the directions of a mounting substrate 60 so as to match the directions of the multilayer ceramic capacitor 10 when the multilayer ceramic capacitor is mounted when specifying the directions of the mounting substrate 60, which will be described later.

In addition, the multilayer body 12 preferably has a rectangular or substantially rectangular parallelepiped shape including six surfaces. The multilayer body 12 includes a first main surface 12a and a second main surface 12b that face each other in the stacking direction x of the dielectric layers 14; a first end surface 12c and a second end surface 12d that face each other in the length direction y that is orthogonal or substantially orthogonal to the stacking direction x; and a first side surface 12e and a second side surface 12f that face each other in the width direction z that is orthogonal or substantially orthogonal to the stacking direction x and the length direction y. In addition, the multilayer body 12 preferably has rounded corner portions and edge portions. The term "corner portion" refers to a portion of the multilayer body where three adjacent surfaces of the multilayer body intersect each other, and the term "edge portion" refers to a portion of the multilayer body where two adjacent surfaces of the multilayer body intersect each other.

The dielectric layers 14 include outer layer portions 14a and an inner layer portion 14b. The outer layer portions 14a are located at the first main surface 12a side and the second main surface 12b side of the multilayer body 12, and are defined by the dielectric layer 14 that is located between the first main surface 12a and the inner electrode that is closest to the first main surface 12a, and the dielectric layer 14 that is located between the second main surface 12b and the inner electrode that is closest to the second main surface 12b. The region sandwiched between the two outer layer portions 14a defines the inner layer portion 14b.

The dielectric layers 14 may be made of a dielectric material. For example, barium titanate, calcium titanate, strontium titanate, barium calcium titanate or a dielectric ceramic having calcium zirconate or other suitable dielectric material as a main component may be used as the dielectric material. In the case where one of the above-described dielectric materials is included as a main component, a dielectric material may be used that is obtained by adding to the main component a sub-component such as a Mg compound, a Mn compound, a Si compound, an Al compound, a V compound or a Ni compound, for example, in a smaller content than the main component in accordance with the desired characteristics of the multilayer ceramic capacitor 10.

It is preferable that the average thickness of the dielectric layers 14 in the stacking direction x after firing is about 0.5 μm to about 2 μm, for example. Furthermore, it is preferable that the thickness of the outer layer portions 14a in the stacking direction x is about 30 μm to about 60 μm on each side, for example.

As illustrated in FIGS. 2 and 3, the multilayer body 12 includes a plurality of first inner electrodes 16 and a plurality of second inner electrodes 18. The plurality of first inner electrodes 16 and the plurality of second inner electrodes 18 are buried in the multilayer body 12 so as to be arranged in an alternating manner at regular intervals in the stacking direction x of the multilayer body 12.

As illustrated in FIG. 4A, the first inner electrodes 16 each include a first facing electrode portion 16a that faces the second inner electrodes 18, a first extending electrode portion 16b that extends to the first end surface 12c of the multilayer body 12 from the first facing electrode portion 16a, and a second extending electrode portion 16c that extends to the second end surface 12d of the multilayer body 12 from the first facing electrode portion 16a. Specifically, the first extending electrode portion 16b is exposed at the first end surface 12c of the multilayer body 12, and the second extending electrode portion 16c is exposed at the second end surface 12d of the multilayer body 12. Therefore, the first inner electrodes 16 are not exposed at the first side surface 12e and the second side surface 12f of the multilayer body 12. In each first inner electrode 16, the sizes of the first extending electrode portion 16b and the second extending electrode portion 16c in the width direction z are preferably the same or substantially the same as the size of the first facing electrode portion 16a in the width direction z. In addition, in each first inner electrode 16, the sizes of the first extending electrode portion 16b and the second extending electrode portion 16c in the width direction z are preferably smaller than the size of the first facing electrode portion 16a in the width direction z. In this case, the interlayer contact area between the dielectric layers 14 is comparatively increased, and therefore, the occurrence of delamination between the dielectric layers 14 is reduced or prevented.

As illustrated in FIG. 4B, the second inner electrodes are preferably substantially cross shaped, for example, and each includes a second facing electrode portion 18a that faces the first inner electrodes 16, a third extending electrode portion 18b that extends to the first side surface 12e of the multilayer body from the second facing electrode portion 18a, and a fourth extending electrode portion 18c that extends to the second side surface 12f of the multilayer body 12 from the second facing electrode portion 18a. Specifically, the third extending electrode portion 18b is exposed at the first side surface 12e of the multilayer body 12, and the fourth extending electrode portion 18c is exposed at the second side surface 12f of the multilayer body 12. Therefore, the second inner electrodes 18 are not exposed at the first end surface 12c and the second end surface 12d of the multilayer body 12. In addition, in each second inner electrode 18, the sizes of the third extending electrode portion 18b and the fourth extending electrode portion 18c in the length direction y are preferably smaller than the size of the second facing electrode portion 18a in the length direction y. In this case, the interlayer contact area between the dielectric layers 14 is comparatively increased, and therefore, the occurrence of delamination between the dielectric layers 14 is reduced or prevented.

Furthermore, the multilayer body 12 includes side portions (hereafter, also referred to as "W gaps") 14c of the multilayer body 12 that are provided between one end of the first facing electrode portion 16a of each first inner electrode 16 in the width direction z and the first side surface 12e and between the other end of each first facing electrode portion 16a in the width direction z and the second side surface 12f; and side portions 14c of the multilayer body 12 that are provided between one end of the second facing electrode portion 18a of each second inner electrode 18 in the width direction z and the first side surface 12e, and between the other end of each second facing electrode portion 18a in the width direction z and the second side surface 12f. In addition, the multilayer body 12 includes end portions (hereafter, also referred to as "L gaps") 14d of the multilayer body 12 that are provided between one end of each second inner electrode 18 in the length direction y and the first end surface 12c, and between the other end of each second inner electrode 18 in the length direction y and the second end surface 12d. The average length of the end portions (L gaps) 14d in the length direction y is preferably about 30 μm to about 100 µm, for example. In addition, the average length of the side portions (W gaps) 14c in the width direction z is preferably about 30 µm to about 100 µm, and more preferably about 60 µm to about 80 µm, for example.

The first facing electrode portions 16a of the first inner electrodes 16 and the second facing electrode portions 18a of the second inner electrodes 18 of the multilayer body 12 face one another with the dielectric layers 14 made of a dielectric ceramic material interposed therebetween, and as a result, electrostatic capacitances are provided. Thus, the multilayer ceramic capacitor 10 defines and functions as a capacitor.

The first inner electrodes 16 and the second inner electrodes 18 are parallel or substantially parallel to the first main surface 12a and the second main surface 12b of the multilayer body 12.

The first inner electrodes 16 and the second inner electrodes 18 may be made of a suitable conductive material. The first inner electrodes 16 and the second inner electrodes 18 preferably include a metal such as Ni, Cu, Ag, Pd or Au, or an alloy containing one of these metals such as a Ag—Pd alloy, for example. The first inner electrodes 16 and the second inner electrodes 18 may further include dielectric particles having the same or substantially the same composition as the ceramic contained in the dielectric layers 14.

The total number of first inner electrodes 16 and second inner electrodes 18 is preferably about 100-700, for example. In addition, the average thickness of the first inner electrodes 16 and the second inner electrodes 18 is preferably about 0.3 µm to about 2 µm, for example.

A first end surface outer electrode 20 is located on the first end surface 12c of the multilayer body 12. The first end surface outer electrode 20 extends from the first end surface 12c of the multilayer body 12 and cover a portion of each of the first main surface 12a, the second main surface 12b, the first side surface 12e and the second side surface 12f. In addition, the first end surface outer electrode 20 is electrically connected to the first extending electrode portions 16b of the first inner electrodes 16 that are exposed at the first end surface 12c.

A second end surface outer electrode 22 is located on the second end surface 12d of the multilayer body 12. The second end surface outer electrode 22 extends from the second end surface 12d of the multilayer body 12 and cover a portion of each of the first main surface 12a, the second main surface 12b, the first side surface 12e and the second side surface 12f. In addition, the second end surface outer electrode 22 is electrically connected to the second extending electrode portions 16c of the first inner electrodes 16 that are exposed at the second end surface 12d of the multilayer body 12.

A first side surface outer electrode 24 is located on the first side surface 12e of the multilayer body 12. The first side surface outer electrode 24 extends from the first side surface 12e and cover a portion of each of the first main surface 12a and the second main surface 12b. The first side surface outer electrode 24 may instead be located on only the first side surface 12e. In addition, the first side surface outer electrode 24 is electrically connected to the third extending electrode portions 18b of the second inner electrodes 18 that are exposed at the first side surface 12e of the multilayer body 12.

A second side surface outer electrode 26 is located on the second side surface 12f of the multilayer body 12. The second side surface outer electrode 26 extends from the second side surface 12f and cover a portion of each of the first main surface 12a and the second main surface 12b. The second side surface outer electrode 26 may instead be located on only the second side surface 12f. In addition, the second side surface outer electrode 26 is electrically connected to the fourth extending electrode portions 18c of the second inner electrodes 18 that are exposed at the second side surface 12f of the multilayer body 12.

The first side surface outer electrode 24 may instead extend from the first side surface 12e to the second side surface outer electrode 26 so as to cover the first main surface 12a, and may additionally extend from the first side surface 12e to the second side surface outer electrode 26 so as to cover the second main surface 12b, and thus, the first side surface outer electrode 24 may be arranged so as to bridge between the first side surface outer electrode 24 and the second side surface outer electrode 26 and be wound around the multilayer body 12.

In order from the side of the multilayer body 12, the first end surface outer electrode 20 includes a base electrode layer 28 that is located on the surface of the multilayer body 12, and a plating layer 30 that is arranged so as to cover the base electrode layer 28. Similarly, in order from the side of the multilayer body 12, the second end surface outer electrode 22 includes a base electrode layer 32 that is located on the surface of the multilayer body 12, and a plating layer 34 that is arranged so as to cover the base electrode layer 32.

In order from the side of the multilayer body 12, the first side surface outer electrode 24 includes a base electrode layer 36 that is located on the surface of the multilayer body 12, and a plating layer 38 that is arranged so as to cover the base electrode layer 36. Similarly, in order from the side of the multilayer body 12, the second side surface outer electrode 26 includes a base electrode layer 40 that is located on the surface of the multilayer body 12, and a plating layer 42 that is arranged so as to cover the base electrode layer 40.

The base electrode layer 28 is provided on the first end surface 12c of the multilayer body 12, and is preferably structured such that the end portions of the base electrode layer 28 extend onto the first main surface 12a, the second main surface 12b, the first side surface 12e and the second side surface 12f of the multilayer body 12. The base electrode layer 32 is provided on the second end surface 12d of the multilayer body 12, and is preferably structured such that the end portions of the base electrode layer 32 extend onto the first main surface 12a, the second main surface 12b, the first side surface 12e and the second side surface 12f of the multilayer body 12.

The base electrode layer 36 is provided on the first side surface 12e of the multilayer body 12, and the base electrode layer 36 is preferably structured such that end portions of the base electrode layer 36 extend onto the first main surface 12a and the second main surface 12b of the multilayer body 12. However, the base electrode layer 36 may instead be provided on only the first side surface 12e of the multilayer body 12. The base electrode layer 40 is provided on the second side surface 12f of the multilayer body 12, and the base electrode layer 40 is preferably structured such that end portions of the base electrode layer 40 extend onto the first main surface 12a and the second main surface 12b of the multilayer body 12. However, the base electrode layer 40 may instead be provided on only the second side surface 12f of the multilayer body 12.

The base electrode layer 28, the base electrode layer 32, the base electrode layer 36, and the base electrode layer 40 are each preferably made of at least one layer selected from among a baked layer, a resin layer and a thin film layer. The baked layer includes a conductive metal and a glass component. At least one selected from among Cu, Ni, Ag, Pd, a Ag—Pd alloy or Au may be used as the conductive metal, for example. The baked layer may include a plurality of layers. A glass containing B, Si, Ba, Mg, Al or Li may be used as the glass component, for example. The baked layer is obtained by applying a conductive paste containing a conductive metal and a glass component onto the end portions of the multilayer body 12 and then baking the conductive paste. The baked layer may be co-fired with the multilayer body 12, or may be baked after the multilayer body 12 has been fired. The thickness of the baked layer is preferably about 10 µm to about 60 µm, for example, at the thickest portion thereof.

At least one selected from among Cu, Ni, Ag, Pd, a Ag—Pd alloy, Au or Sn is preferably used as the material of the plating layer 30, the plating layer 34, the plating layer 38, and the plating layer 42, for example. The plating layer 30, the plating layer 34, the plating layer 38, and the plating layer 42 may each include a plurality of layers. The plating layer 30, the plating layer 34, the plating layer 38, and the plating layer 42 preferably have a two-layer structure including a Ni plating layer and a Sn plating layer, for example. The Ni plating layer prevents the base electrode layer 28, the base electrode layer 32, the base electrode layer 36, and the base electrode layer 40 from being corroded by solder when mounting the multilayer ceramic capacitor 10. The Sn plating layer improves the wettability of solder when mounting the multilayer ceramic capacitor 10 and makes it easier to mount the multilayer ceramic capacitor 10. The average thickness of the Ni plating layer is preferably about 1 µm to about 7 µm, for example. The average thickness of the Sn plating layer is preferably about 1 µm to about 8 µm, for example.

Here, a maximum outer dimension L of the multilayer ceramic capacitor 10 in the length direction y satisfies a condition of L≤about 1.4 mm, for example. The maximum outer dimension L of the multilayer ceramic capacitor 10 in the length direction y is more preferably about 1.3 mm or less, for example. In addition, a condition of about 1.1≤L/W≤about 1.6 is satisfied between the maximum outer dimension L of the multilayer ceramic capacitor 10 in the length direction y and a maximum outer dimension W of the multilayer ceramic capacitor 10 in the width direction z. A maximum outer dimension T of the multilayer ceramic capacitor 10 in the stacking direction x is preferably about 0.5 mm to about 1.0 mm, for example. In addition, the dimensions of the multilayer ceramic capacitor 10 may be measured using a microscope, for example.

Furthermore, e satisfies the condition e≥about 0.10 mm, where e is the distance in the length direction y along which the first end surface outer electrode 20 or second end surface outer electrode 22 located on the first side surface 12e extends, or the distance in the length direction y along which the first end surface outer electrode 20 or second end surface outer electrode 22 located on the second side surface 12f extends. Furthermore, the distance in the length direction y along which the first end surface outer electrode 20 or the second end surface outer electrode 22 located on the first side surface 12e extends, and the distance in the length direction y along which the first end surface outer electrode 20 or the second end surface outer electrode 22 located on the second side surface 12f extends preferably have the same or substantially the same size.

In addition, a condition i/g>about 2 is satisfied between g and i, where g is the smallest distance out of a distance in the length direction y between the first end surface outer electrode 20 and the first side surface outer electrode 24 located on the first side surface 12e, a distance in the length direction y between the second end surface outer electrode 22 and the first side surface outer electrode 24 located on the first side surface 12e, a distance in the length direction y between the first end surface outer electrode 20 and the second side surface outer electrode 26 located on the second side surface 12f, and a distance in the length direction y between the second end surface outer electrode 22 and the second side surface outer electrode 26 located on the second side surface 12f, and i is the distance on the side where the g is located out of a distance in the length direction along which the first side surface outer electrode 24 located on the first side surface 12e extends and a distance in the length direction y along which the second side surface outer electrode 26 located on the second side surface 12f extends. Furthermore, a distance in the length direction y between the first end surface outer electrode 20 or the second end surface outer electrode 22 and the first side surface outer electrode 24 located on the first side surface 12e, and the distance in the length direction y between the first end surface outer electrode 20 or the second end surface outer electrode 22 and the second side surface outer electrode 26 located on the second side surface 12f are the same as each other.

In addition, a condition i/L>about 0.40 is satisfied between i and L, where i is the distance on the side where the g is located out of a distance in the length direction y along which the first side surface outer electrode 24 located on the first side surface 12e extends and a distance in the length direction y along which the second side surface outer electrode 26 located on the second side surface 12f extends and L is the maximum outer dimension of the multilayer ceramic capacitor 10 in the length direction y. In addition, the distance in the length direction y along which the first side surface outer electrode 24 located on the first side surface 12e extends and the distance in the length direction y along which the second side surface outer electrode 26 located on the second side surface 12f extends are the same as each other.

Furthermore, it is preferable that the condition i−a≤about 0.3 mm be satisfied between i and a, where i is the distance on the side where the g is located out of the distance in the length direction y along which the first side surface outer electrode 24 located on the first side surface 12e extends and the distance in the length direction y along which the second side surface outer electrode 26 located on the second side surface 12f extends, and a is the distance on the side where the i is located out of a distance in the length direction y along which the leading end of the third extending electrode portion 18b of the second inner electrode 18 extends and the distance in the length direction y along which the fourth extending electrode portion 18c of the second inner electrode 18 extends. The distance in the length direction y along which the leading end of the third extending electrode portion 18b of each second inner electrode 18 extends and the distance in the length direction y along which the leading end of the fourth extending electrode portion 18c of each second inner electrode 18 extends have the same size as each other.

According to the multilayer ceramic capacitor 10 illustrated in FIG. 1, when L is the maximum outer dimension of the multilayer ceramic capacitor 10 in the length direction y; W is the maximum outer dimension of the multilayer ceramic capacitor in the width direction z; e is the distance in the length direction y along which the first end surface outer electrode 20 or the second end surface outer electrode 22 located on the first side surface 12e extends or the distance in the length direction y along which the first end surface outer electrode 20 or the second end surface outer electrode 22 located on the second side surface 12f extends; g is the smallest distance out of a distance in the length direction y between the first end surface outer electrode 20 and the first side surface outer electrode 24 located on the first side surface 12e, a distance in the length direction y between the second end surface outer electrode 22 and the first side surface outer electrode 24 located on the first side surface 12e, a distance in the length direction y between the first end surface outer electrode 20 and the second side surface outer electrode 26 located on the second side surface 12f, and a distance in the length direction y between the second end surface outer electrode 22 and the second side surface outer electrode 26 located on the second side surface 12f; and i is the distance on the side where the g is located out of a distance in the length direction along which the first side surface outer electrode 24 located on the first side surface 12e extends and a distance in the length direction y along which the second side surface outer electrode 26 located on the second side surface 12f extends, the conditions:

L≤1.4 about mm,
about 1.1≤L/W≤about 1.6,
e≥about 0.10 mm,
i/L>about 0.40, and
i/g>about 2 are satisfied, and therefore, a multilayer ceramic capacitor having a low ESL is obtained.

In addition, according to the multilayer ceramic capacitor 10 illustrated in FIG. 1, a multilayer ceramic capacitor having a low ESL is obtained with certainty when the thickness in the stacking direction x of the outer layer part 14a on each side is about 60 μm or less, for example.

Furthermore, according to the multilayer ceramic capacitor 10 illustrated in FIG. 1, when the average lengths in the width direction z of the side portions (W gaps) 14c of the multilayer body 12 that are provided between one end of the first facing electrode portion 16a of each first inner electrode 16 in the width direction z and the first side surface 12e and between the other end of the first facing electrode portion 16a in the width direction z and the second side surface 12f and of the side portions 14c (W gaps) of the multilayer body 12 that are provided between one end of the second facing electrode portion 18a of each second inner electrode 18 in the width direction z and the first side surface 12e, and between the other end of the second facing electrode portion 18a in the width direction z and the second side surface 12f are about 80 μm or less, a multilayer ceramic capacitor having a low ESL is obtained due to it being possible to make distance along which the current flows smaller.

Furthermore, according to the multilayer ceramic capacitor 10 illustrated in FIG. 1, when the condition i−a≤about 0.3 mm is satisfied between i that is the distance on the side where the g is located out of the distance in the length direction y along which the first side surface outer electrode 24 located on the first side surface 12e extends and the distance in the length direction y along which the second side surface outer electrode 26 located on the second side surface 12f extends, and a that is the distance on the side where the i is located out of the distance in the length direction y along which the leading end of the third extending electrode portion 18b of the second inner electrode 18 extends or the distance along which the fourth extending electrode portion 18c of the second inner electrode 18 extends.

Next, a non-limiting example of a method of manufacturing a multilayer ceramic capacitor according to a preferred embodiment of the present invention will be described. Hereafter, a case in which the multilayer ceramic capacitor 10 is mass manufactured will be described as an example. When the multilayer ceramic capacitor 10 is mass manufactured, a mother multilayer body that includes a plurality of multilayer bodies 12 is manufactured.

First, ceramic green sheets, an inner electrode conductive paste that is for forming the first inner electrodes 16 and the second inner electrodes 18, and an outer electrode conductive paste that is for forming the first end surface outer electrode 20, the second end surface outer electrode 22, the first side surface outer electrode 24 and the second side surface outer electrode 26 are prepared. An organic binder and solvent are included in the ceramic green sheets, the inner electrode conductive paste and the outer electrode conductive paste, and a known organic binder and a known organic solvent may be used.

Inner electrode patterns are formed on the ceramic green sheets by applying the inner electrode conductive paste onto the ceramic green sheets in prescribed patterns, for example. The inner electrode conductive paste may be applied using a known method, such as a screen printing method, for example.

Next, a mother multilayer body is manufactured by stacking a prescribed number of outer layer ceramic green sheets on which inner electrode patterns are not printed, sequentially stacking the ceramic green sheets thereon on which the inner electrode patterns have been printed, and stacking thereon a prescribed number of outer layer ceramic green sheets. As necessary, the mother multilayer body may be subjected to pressure bonding in the stacking direction using an isostatic press, for example.

After that, the mother multilayer body is cut into pieces of a prescribed size and shape, and raw multilayer chips are thus cut out. At this time, the corner portions and edge portions of the multilayer body may be rounded by performing barrel grinding, for example.

Next, the raw multilayer bodies 12 are fired. Thus, the multilayer bodies 12 including the first inner electrodes 16 and the second inner electrodes 18 arranged therein are formed. The first extending electrode portions 16b of the first inner electrodes 16 extend to the first end surface 12c of the multilayer body 12, and the second extending electrode portions 16c of the first inner electrodes 16 extend to the second end surface 12d of the multilayer body 12. The third extending electrode portions 18b of the second inner electrodes 18 extend to the first side surface 12e of the multilayer body 12, and the fourth extending electrode portions 18c of the second inner electrodes 18 extend to the second side surface 12f of the multilayer body 12. The firing temperature of the raw multilayer bodies 12 may be appropriately set in accordance with the ceramic material and conductive material used. The firing temperature of the raw multilayer bodies 12 is preferably about 900° C. to about 1300° C., for example. The ceramic green sheets and the inner electrode conductive paste are fired at the same time.

Next, the base electrode layer 28 of the first end surface outer electrode 20 is formed by applying a conductive paste to the first end surface 12c of the multilayer body 12 and then baking the conductive paste, and the base electrode layer 32 of the second end surface outer electrode 22 is formed by applying a conductive paste to the second end surface 12d and then baking the conductive paste. Furthermore, the base electrode layer 36 of the first side surface outer electrode 24 is formed by applying a conductive paste to the first side surface 12e of the multilayer body 12 and then baking the conductive paste, and the base electrode layer 40 of the second side surface outer electrode 26 is formed by applying a conductive paste to the second side surface 12f and then baking the conductive paste. The baking temperature is preferably about 700° C. to about 900° C., for example.

Next, the plating layer 30 is formed on the surface of the base electrode layer 28 of the first end surface outer electrode 20, and the plating layer 34 is formed on the surface of the base electrode layer 32 of the second end surface outer electrode 22. In addition, the plating layer 38 is formed on the surface of the base electrode layer 36 of the first side surface outer electrode 24, and the plating layer 42 is formed on the surface of the base electrode layer 40 of the second side surface outer electrode 26.

Thus, the multilayer ceramic capacitor 10 illustrated in FIG. 1 is manufactured.

Next, a multilayer ceramic capacitor mount structure according to a preferred embodiment of the present invention will be described. Here, the term "multilayer ceramic capacitor mount structure" refers to a structure obtained by mounting a multilayer ceramic capacitor on a substrate.

Figure 5:
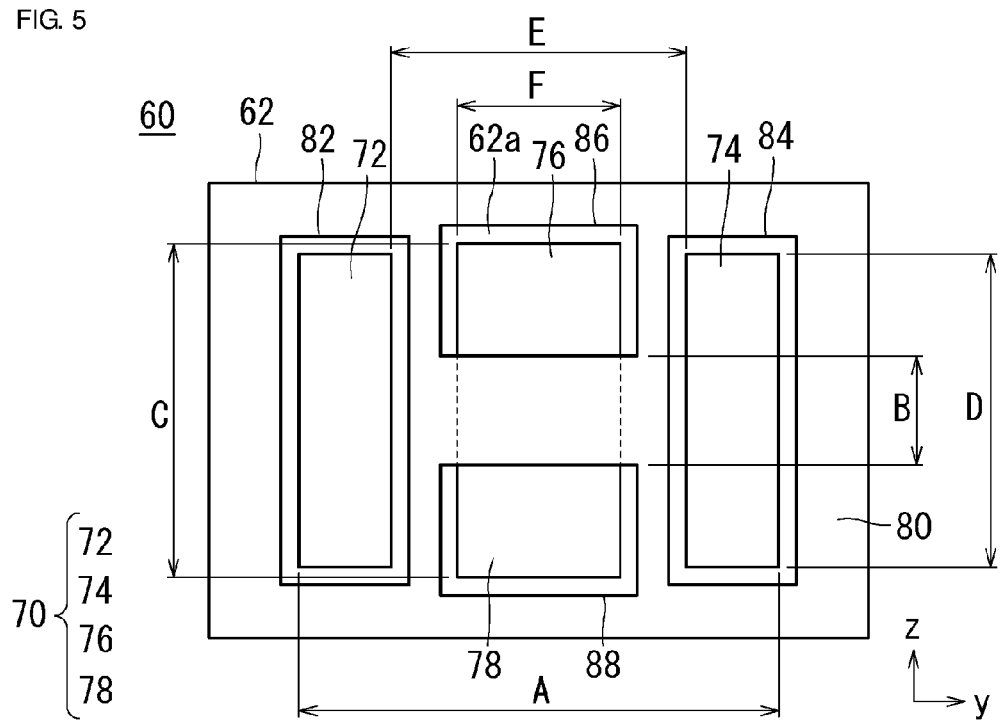
FIG. 5 is a plan view of a mounting substrate of a multilayer ceramic capacitor mount structure according to a preferred embodiment of the present invention.
Figure 6:
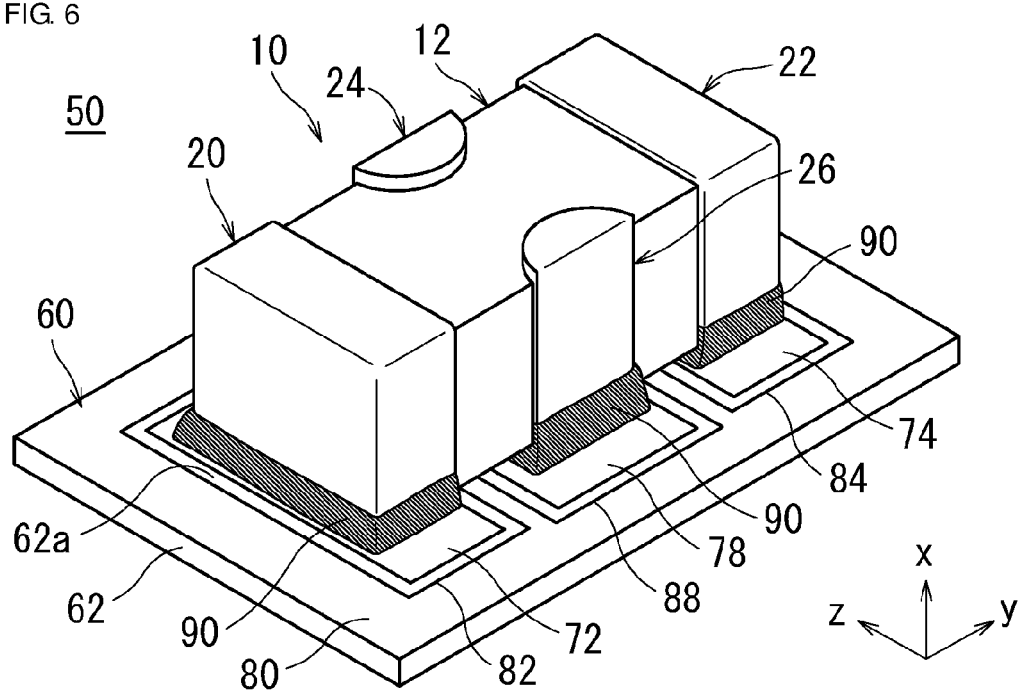
FIG. 6 is an external perspective view illustrating an example of a multilayer ceramic capacitor mount structure according to a preferred embodiment of the present invention.

FIG. 5 is a plan view of a mounting substrate of a multilayer ceramic capacitor mount structure according to a preferred embodiment of the present invention. In addition, FIG. 6 is an external perspective view illustrating an example of a multilayer ceramic capacitor mount structure according to a preferred embodiment of the present invention.

First, a mounting substrate 60 of a multilayer ceramic capacitor mount structure 50 according to a preferred embodiment of the present invention will be described while referring to FIG. 5.

As illustrated in FIG. 5, the mounting substrate 60 preferably has a flat or substantially flat plate shape, and includes a base portion 62, lands 70 that are located on a surface of the base portion 62, and an insulating layer 80 that is arranged so as to cover the surface of the base portion 62 with portions of the lands 70 exposed therethrough.

The base portion 62 preferably has a flat or substantially flat plate shape including a pair of main surfaces, and a conductor pattern that defines wiring lines is provided on at least one main surface 62a thereof. Regarding the material of the base portion 62, the base portion 62 may be composed of a resin material, such as an epoxy resin or a ceramic material, such as alumina, or a material obtained by adding a filler, a fabric, or other suitable material composed of an inorganic material or an organic material to such a material may be used as the material, for example. Typically, a glass epoxy substrate obtained by adding a glass fabric to a base material composed of an epoxy resin, for example, is suitably used as the base portion 62.

The lands 70 include a first land 72, a second land 74, a third land 76, and a fourth land 78.

The first land 72 and the second land 74 are located on the one main surface 62a of the base portion 62 so as to be spaced apart from each other in the length direction y. The first land 72 and the second land 74 each correspond to a portion of the conductor pattern described above, and are arranged side by side on the base portion 62 so as to correspond to the first end surface outer electrode 20 and the second end surface outer electrode 22 of the multilayer ceramic capacitor 10. The first land 72 and the second land 74 each preferably have a rectangular or substantially rectangular shape. For example, a suitable conductive material, such as Cu or Ag, may be used as the material of the first land 72 and the second land 74, but a metal material, such as copper foil is generally used.

The third land 76 and the fourth land 78 are located between the first land 72 and the second land 74 on the one main surface 62a of the base portion 62 so as to be separated from each other in the width direction z by the insulating layer 80. In other words, although the third land 76 and the fourth land 78 are formed so as to be integrated with each other, the third land 76 and the fourth land 78 are separated from each other as a result of being partially covered by the insulating layer 80, and are arranged in a direction that is orthogonal or substantially orthogonal to a direction that connects the first land 72 and the second land 74. The third land 76 and the fourth land 78 each correspond to a portion of the conductor pattern described above, and are arranged side by side on the base portion 62 so as to correspond to the first side surface outer electrode 24 and the second side surface outer electrode 26 of the multilayer ceramic capacitor 10. The third land 76 and the fourth land 78 each preferably has a rectangular or substantially rectangular shape. For example, a suitable conductive material, such as Cu or Ag, may be used as the material of the third land 76 and the fourth land 78, but a metal material such as copper foil is generally used.

A distance A in the length direction y from an end portion of the first land 72 on the opposite side from the side where the second land 74 is located to an end portion of the second land 74 on the opposite side from the side where the first land 72 is located is preferably about 1.4 mm to about 1.6 mm, for example, taking into consideration the maximum outer dimension L of the multilayer ceramic capacitor 10 in the length direction y described above.

A distance B in the width direction z between the third land 76 and the fourth land 78 is preferably about 0.3 mm to about 0.4 mm, for example. In addition, a distance C in the width direction z from an end portion of the third land 76 on the opposite side from the side where the fourth land 78 is located to an end portion of the fourth land 78 on the opposite side from the side where the third land 76 is located is preferably about 0.95 mm to about 1.1 mm.

In this case, as illustrated in FIG. 5, for example, a distance D along which the first land 72 and the second land 74 extend in the width direction z is preferably about 0.95 mm, a distance E in the length direction y from an end portion of the first land 72 on the side where the second land 74 is located to an end portion of the second land 74 on the side where the first land 72 is located is preferably about 0.9 mm, and a distance F along which the third land 76 and the fourth land 78 extend in the length direction y is preferably about 0.5 mm, for example.

The insulating layer 80 may be made of an epoxy-based resin, for example.

A first exposing portion 82 that causes the first land 72 to be exposed on the one main surface 62a of the base portion 62, a second exposing portion 84 that causes the second land 74 to be exposed on the one main surface 62a of the base portion 62, a third exposing portion 86 that causes the third land 76 to be exposed on the one main surface 62a of the base portion 62, and a fourth exposing portion 88 that causes the fourth land 78 to be exposed on the one main surface 62a of the base portion 62 are formed by the insulating layer 80 on the one main surface 62a of the base portion 62.

As illustrated in FIG. 6, the multilayer ceramic capacitor mount structure 50 includes the multilayer ceramic capacitor 10 and the mounting substrate 60, and the multilayer ceramic capacitor 10 is mounted on the mounting substrate 60 using a bonding material 90.

The multilayer ceramic capacitor 10 is arranged such that the first end surface outer electrode 20 faces the first land of the mounting substrate 60 and such that the second end surface outer electrode 22 faces the second land 74 of the mounting substrate 60. In addition, the multilayer ceramic capacitor 10 is arranged such that the first side surface outer electrode 24 faces the third land 76 of the mounting substrate 60 and such that the second side surface outer electrode 26 faces the fourth land 78 of the mounting substrate 60.

Thus, the multilayer ceramic capacitor 10 is arranged such that the second main surface 12b of the multilayer body 12 faces the one main surface 62a of the base portion 62 of the mounting substrate 60.

The first land 72 and the first end surface outer electrode 20, which are arranged so as to face each other, are adhered to each other and electrically connected to each other by the bonding material 90. In addition, the second land 74 and the second end surface outer electrode 22, which are arranged so as to face each other, are adhered to each other and electrically connected to each other by the bonding material 90. Similarly, the third land 76 and the first side surface outer electrode 24, which are arranged so as to face each other, are adhered to each other and electrically connected to each other by the bonding material 90. In addition, the fourth land 78 and the second side surface outer electrode 26, which are arranged so as to face each other, are adhered to each other and electrically connected to each other by the bonding material 90.

Provided that the bonding material 90 has conductivity, the bonding material 90 is not particularly limited. For example, the bonding material may be composed of solder (for example, composition: Sn-3Ag-0.5Cu).

According to the multilayer ceramic capacitor mount structure 50, regarding the mounting substrate 60 that includes the base portion 62, when A is the distance in the length direction y from the end portion of the first land 72 on the opposite side from the side where the second land 74 is located to the end portion of the second land 74 on the opposite side from the side where the first land 72 is located, B is the distance in the width direction z between the third land 76 and the fourth land 78, and C is the distance in the width direction z from the end portion of the third land 76 on the opposite side from the side where the fourth land 78 is located to the end portion of the fourth land 78 on the opposite side from the side where the third land 76 is located in the case where the first land 72 and the second land 74 are located on the one main surface 62a of the base portion 62 so as to be separated from each other in the length direction y and the third land 76 and the fourth land 78 are located between the first land 72 and the second land 74 on the one main surface 62a of the base portion 62 so as to be separated from each other in the width direction z among the first land 72, the second land 74, the third land 76 and the fourth land 78 located on the one main surface 62a of the base portion 62, A is about 1.4 mm to about 1.6 mm, B is about 0.3 mm to about 0.4 mm, and C is about 0.95 mm to about 1.1 mm, and therefore, the fixing force in the case where the multilayer ceramic capacitor 10 illustrated in FIG. 1 is mounted on the mounting substrate 60 is improved due to the respective distances being set by taking into consideration the size of the multilayer ceramic capacitor 10 illustrated in FIG. 1, and therefore an effect that the stability is improved when mounting the multilayer ceramic capacitor 10 is achieved.

Hereafter, experimental examples will be described that were performed by the inventors in order to verify the advantageous effects of preferred embodiments of the present invention.

An experiment was performed to measure the ESL of the multilayer ceramic capacitor 10 under prescribed conditions, the multilayer ceramic capacitor being obtained using the above-described method.

In addition, an experiment was performed to verify the fixing force of the multilayer ceramic capacitor 10 with respect to the mounting substrate 60 and the directional alignment of the multilayer ceramic capacitor 10 in the multilayer ceramic capacitor mount structure 50.

When the above experiments were performed, multilayer ceramic capacitors of examples and comparative examples having the specifications described in Table 1 and below were manufactured in accordance with the method of manufacturing a multilayer ceramic capacitor described above. In addition, the dimensions are design values.

Dimensions of Multilayer Ceramic Capacitors: As Described in Table 1

Average thickness of dielectric layers: about 0.65 μm

Main component of material of dielectric layers: Barium titanate

Sub-components of material of dielectric layers: Magnesium, vanadium, dysprosium, silicon Material of inner electrodes: Ni Average thickness of inner electrodes: about 0.5 μm Structure of outer electrodes: Structure including base electrode layer (baked layer) and plating layer Material of base electrode layers (baked layers): material including Cu and glass Plating layer: Two-layer structure consisting of Ni plating and Sn plating

TABLE 1

| | L (mm) | W (mm) | T (mm) | e (mm) | i (mm) | g (mm) | a (mm) | i-a (mm) | THICKNESS OF OUTER LAYER PART (μm) | W GAP (μm) | i/g | i/L | L/W |
|---|---|---|---|---|---|---|---|---|---|---|---|---|---|
| EXAMPLE 1 | 1.2 | 0.9 | 0.75 | 0.15 | 0.50 | 0.20 | 0.30 | 0.2 | 30 | 60 | 2.50 | 0.42 | 1.3 |
| EXAMPLE 2 | 1.2 | 0.9 | 0.75 | 0.10 | 0.60 | 0.20 | 0.40 | 0.2 | 30 | 60 | 3.00 | 0.50 | 1.3 |
| EXAMPLE 3 | 1.2 | 0.9 | 0.75 | 0.15 | 0.50 | 0.20 | 0.30 | 0.2 | 40 | 60 | 2.50 | 0.42 | 1.3 |
| EXAMPLE 4 | 1.2 | 0.9 | 0.75 | 0.15 | 0.50 | 0.20 | 0.30 | 0.2 | 30 | 80 | 2.50 | 0.42 | 1.3 |
| EXAMPLE 5 | 1.2 | 0.9 | 0.75 | 0.15 | 0.50 | 0.20 | 0.30 | 0.2 | 30 | 100 | 2.50 | 0.42 | 1.3 |
| EXAMPLE 6 | 1.2 | 0.9 | 0.75 | 0.18 | 0.50 | 0.17 | 0.30 | 0.2 | 40 | 60 | 2.94 | 0.42 | 1.3 |
| EXAMPLE 7 | 1.3 | 0.8 | 0.75 | 0.15 | 0.60 | 0.20 | 0.40 | 0.2 | 30 | 60 | 3.00 | 0.46 | 1.6 |
| EXAMPLE 8 | 1.1 | 1.0 | 0.75 | 0.10 | 0.50 | 0.20 | 0.30 | 0.2 | 30 | 60 | 2.50 | 0.45 | 1.1 |
| EXAMPLE 9 | 1.2 | 0.9 | 0.75 | 0.10 | 0.60 | 0.20 | 0.40 | 0.2 | 60 | 60 | 3.00 | 0.50 | 1.3 |
| EXAMPLE 10 | 1.2 | 0.9 | 0.75 | 0.10 | 0.60 | 0.20 | 0.30 | 0.3 | 30 | 60 | 3.00 | 0.50 | 1.3 |
| COMPARATIVE EXAMPLE 1 | 1.2 | 0.9 | 0.75 | 0.15 | 0.30 | 0.30 | 0.10 | 0.2 | 30 | 60 | 1.00 | 0.25 | 1.3 |

TABLE 1-continued

| | L (mm) | W (mm) | T (mm) | e (mm) | i (mm) | g (mm) | a (mm) | i-a (mm) | THICKNESS OF OUTER LAYER PART (μm) | W GAP (μm) | i/g | i/L | L/W |
|---|---|---|---|---|---|---|---|---|---|---|---|---|---|
| COMPARATIVE EXAMPLE 2 | 1.2 | 0.9 | 0.75 | 0.15 | 0.40 | 0.25 | 0.20 | 0.2 | 30 | 60 | 1.60 | 0.33 | 1.3 |
| COMPARATIVE EXAMPLE 3 | 1.8 | 1.0 | 0.75 | 0.15 | 0.50 | 0.20 | 0.30 | 0.2 | 30 | 60 | 2.50 | 0.28 | 1.8 |
| COMPARATIVE EXAMPLE 4 | 1.8 | 1.0 | 0.75 | 0.15 | 0.75 | 0.20 | 0.55 | 0.2 | 30 | 60 | 3.75 | 0.42 | 1.8 |
| COMPARATIVE EXAMPLE 5 | 1.2 | 0.9 | 0.75 | 0.05 | 0.50 | 0.30 | 0.30 | 0.2 | 30 | 60 | 1.67 | 0.42 | 1.3 |
| COMPARATIVE EXAMPLE 6 | 1.0 | 1.0 | 0.75 | 0.10 | 0.40 | 0.20 | 0.20 | 0.2 | 30 | 60 | 2.00 | 0.40 | 1.0 |

Five samples were manufactured for each example and comparative example, and the samples were mounted on a mounting substrate. The ESL values of the samples were measured using a network analyzer (company name: Agilent; model number E5071B), and the average values of the ESL values of the samples were calculated. The measurement frequency band was about 100 MHz.

A glass epoxy substrate was used as the mounting substrate 60 in the evaluations.

Regarding the lands 70 located on the glass epoxy substrate, as illustrated in FIG. 5, the distance A in the length direction y from the end portion of the first land 72 on the opposite side from the side where the second land 74 is located to the end portion of the second land 74 on the opposite side from the side where the first land 72 is located was set to be about 1.4 mm, the distance B in the width direction z between the third land 76 and the fourth land 78 was set to be about 0.3 mm, and the distance C in the width direction z from the end portion of the third land 76 on the opposite side from the side where the fourth land 78 is located to the end portion of the fourth land 78 on the opposite side from the side where the third land 76 is located was set to be about 0.95 mm.

In addition, as illustrated in FIG. 5, the distance D in the width direction z along which the first land 72 and the second land 74 extend was set to be about 0.95 mm, the distance E in the length direction y from the end portion of the first land 72 on the side where the second land 74 is located to an end portion of the second land 74 on the side where the first land 72 is located was set to be about 0.9 mm, and the distance F in the length direction y along which the third land 76 and the fourth land 78 extend was set to be about 0.5 mm.

The samples were mounted on a mounting substrate using solder (composition: Sn-3Ag-0.5Cu), and were subjected to a heat cycle test. The conditions of the heat cycle test were that one cycle consisted of about −40° C./30 mins to about 85° C./30 mins, and a total of 1000 cycles were performed. After that, the side surfaces of the multilayer ceramic capacitors were laterally pressed with a force of about 5 N for about 10 s.

Ten samples were subjected to the test, and if even one multilayer ceramic capacitor became detached from the mounting substrate, the fixing force was judged to be unsatisfactory.

The multilayer ceramic capacitors were evaluated by being passed along a fixed-width passage of a part feeder. 10000 samples of each of the examples and comparative examples were evaluated and if the directions of the samples were not all the same and there was even one multilayer ceramic capacitor that had rotated after having passed along the passage of the part feeder, the directional alignment was judged to be unsatisfactory. Directional alignment was not possible in comparative example 6 in which the maximum outer dimension L in the length direction y and the maximum outer dimension W in the width direction z of the multilayer ceramic capacitor were the same as each other.

The experimental results of the experiment of measuring the ESL values of the multilayer ceramic capacitors and the experiment of verifying the fixing force of each multilayer ceramic capacitor 10 with respect to the mounting substrate 60 and the directional alignment of each multilayer ceramic capacitor 10 as described above are listed in Table 2. The symbol "-" in the table indicates that the experiment was not performed.

TABLE 2

| | ESL (pH) | FIXING FORCE | DIRECTIONAL ALIGNMENT |
|---|---|---|---|
| EXAMPLE 1 | 141 | — | — |
| EXAMPLE 2 | 134 | — | — |
| EXAMPLE 3 | 144 | — | — |
| EXAMPLE 4 | 144 | — | — |
| EXAMPLE 5 | 146 | — | — |
| EXAMPLE 6 | 144 | — | — |
| EXAMPLE 7 | 144 | ○ | ○ |
| EXAMPLE 8 | 138 | ○ | ○ |
| EXAMPLE 9 | 142 | ○ | ○ |
| EXAMPLE 10 | 140 | ○ | ○ |
| COMPARATIVE EXAMPLE 1 | 157 | — | — |
| COMPARATIVE EXAMPLE 2 | 150 | — | — |
| COMPARATIVE EXAMPLE 3 | 163 | — | — |
| COMPARATIVE EXAMPLE 4 | 150 | — | — |
| COMPARATIVE EXAMPLE 5 | 140 | X | ○ |
| COMPARATIVE EXAMPLE 6 | 139 | ○ | X |

Looking first at the results obtained for measurement of ESL, the multilayer ceramic capacitors of examples 1 to 10 satisfied the conditions of L≤about 1.4 mm, about 1.1≤L/W≤about 1.6, e≥about 0.10 mm, i/L>about 0.40 and i/g>about 2, and therefore, good results of a comparatively low ESL were obtained for the multilayer ceramic capacitors of these examples.

In addition, since the thicknesses of the outer layer part 14a on one side is about 60 μm or less in the multilayer ceramic capacitors of examples 1 to 10, good results of a comparatively low ESL were obtained for the multilayer ceramic capacitors according to these examples.

Furthermore, since the average lengths in the width direction z of the side portions (W gaps) 14c of the multilayer body 12 that are provided between one end of the first facing electrode portion 16a of each first inner electrode 16 in the width direction z and the first side surface 12e and between the other end of each first facing electrode portion 16a in the width direction z and the second side surface 12f and of the side portions 14c (W gaps) of the multilayer body 12 that are provided between one end of the second facing electrode portion 18a of each second inner electrode 18 in the width direction z and the first side surface 12e, and between the other end of each second facing electrode portion 18a in the width direction z and the second side surface 12f are about 80 μm or less in the multilayer ceramic capacitors of examples 1 to 10 except for example 5, good results of a comparatively low ESL were obtained for the multilayer ceramic capacitors according to these examples due to it being possible to make distance along which the current flows smaller.

Furthermore, in the multilayer ceramic capacitors 10 of examples 1 to 10, since the condition i−a ≤about 0.3 mm is satisfied between the distance i that is the distance in the length direction y along which the first side surface outer electrode 24 located on the first side surface 12e extends or the distance in the length direction y along which the second side surface outer electrode 26 located on the second side surface 12f extends, and the distance a that is the distance in the length direction y along which the leading end of the third extending electrode portion 18b or the fourth extending electrode portion 18c of each second inner electrode 18 extends, good results of comparatively low values of ESL were obtained for the multilayer ceramic capacitors according to these examples.

In addition, looking at the experimental results for fixing force, good results were obtained for the multilayer ceramic capacitor mount structures of examples 7 to 10 on which the experiment was performed.

In addition, looking at the evaluation results for the directional alignment, good results were also obtained for the multilayer ceramic capacitor mount structures of examples 7 to 10 on which the experiment was performed.

On the other hand, since i/g was about 1.00 and i/L was about 0.25 in comparative example 1, and i/g was about 1.60 and i/L was about 0.33 in comparative example 2, the conditions i/g>about 2 and i/L>about 0.40 were not satisfied, and consequently, the ESL of the multilayer ceramic capacitor of comparative example 1 was about 157 pH and the ESL of the multilayer ceramic capacitor of comparative example 2 was about 150 pH, which are comparatively high ESL values.

In addition, since L was about 1.8 mm, i/L was about 0.28 and L/W was about 1.8 in comparative example 3, the conditions L≤about 1.4 mm, i/L>about 0.40 and about 1.1≤L/W≤about 1.6 were not satisfied, and since L was about 1.8 mm, L/W was about 1.8 in comparative example 4, the conditions L≤about 1.4 mm and about 1.1≤L/W≤about 1.6 were not satisfied, and consequently, the ESL of the multilayer ceramic capacitor of comparative example 3 was about 163 pH, and the ESL of the multilayer ceramic capacitor of comparative example 4 was 150, which are comparatively high ESL values.

Although the multilayer ceramic capacitor of comparative example 5 had a comparatively low ESL and the directional alignment thereof with respect to the mount structure was evaluated as good, since e was about 0.05 mm and i/g was about 1.67, the conditions e≥about 0.10 and i/g>about 2 were not satisfied, and consequently, the fixing force of the multilayer ceramic capacitor with respect to the mounting substrate was reduced, and therefore, there were samples that were judged to be unsatisfactory in the experimental results for fixing force.

Furthermore, although the multilayer ceramic capacitor of comparative example 6 had a comparatively low ESL and had good experimental results regarding the fixing force in the mount structure, i/g was about 2.00, i/L was about 0.40 and L/W was about 1.0, and therefore, the conditions i/g>about 2, i/L>about 0.40 and about 1.1≤L/W≤about 1.6 were not satisfied, and therefore, there were samples that were judged to be unsatisfactory in the evaluation results for directional alignment.

From the above-described results, the advantageous effects exhibited by preferred embodiments of the present invention were confirmed.

In the description of the preferred embodiments above, the configurations of elements that may be combined with each other may be combined with each other. The presently disclosed preferred embodiments are illustrative in all points and should not be considered as limiting. The scope of the present invention is not defined by the above description, but rather, by the scope of the claims and it is intended that equivalents to the scope of the claims and all modifications within the scope of the claims be included within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a multilayer body including a plurality of dielectric layers and a plurality of inner electrodes that are stacked on top of one another, a first main surface and a second main surface that face each other in a stacking direction of the multilayer body, a first end surface and a second end surface that face each other in a length direction of the multilayer body that is orthogonal or substantially orthogonal to the stacking direction, and a first side surface and a second side surface that face each other in a width direction of the multilayer body that is orthogonal or substantially orthogonal to the stacking direction and the length direction of the multilayer body;
a first end surface outer electrode located on the first end surface, extending from the first end surface, and covering a portion of each of the first main surface, the second main surface, the first side surface and the second side surface;
a second end surface outer electrode located on the second end surface, extending from the second end surface, and covering a portion of each of the first main surface, the second main surface, the first side surface and the second side surface;
a first side surface outer electrode located on the first side surface, extending from the first side surface, and covering a portion of each of the first main surface and the second main surface; and
a second side surface outer electrode located on the second side surface, extending from the second side surface, and covering a portion of each of the first main surface and the second main surface; wherein the plurality of inner electrodes includes a plurality of first inner electrodes and a plurality of second inner electrodes;

the plurality of first inner electrodes and the plurality of second inner electrodes are disposed in the multilayer body in an alternating manner in the stacking direction of the multilayer body;

each of the first inner electrodes includes:
- a first facing electrode portion that faces the second inner electrodes;
- a first extending electrode portion that is electrically connected to the first end surface outer electrode and extends to the first end surface of the multilayer body from the first facing electrode portion; and
- a second extending electrode portion that is electrically connected to the second end surface outer electrode and extends to the second end surface of the multilayer body from the first facing electrode portion;

each of the second inner electrodes includes:
- a second facing electrode portion that faces the first inner electrodes;
- a third extending electrode portion that is electrically connected to the first side surface outer electrode and extends to the first side surface of the multilayer body from the second facing electrode portion; and
- a fourth extending electrode portion that is electrically connected to the second side surface outer electrode and extends to the second side surface of the multilayer body from the second facing electrode portion;

L is a maximum outer dimension of the multilayer ceramic capacitor in the length direction;

W is a maximum outer dimension of the multilayer ceramic capacitor in the width direction;

e is a distance in the length direction along which the first end surface outer electrode or second end surface outer electrode located on the first side surface extends, or a distance in the length direction along which the first end surface outer electrode or second end surface outer electrode located on the second side surface extends;

g is a smallest distance out of:
- a distance in the length direction between the first end surface outer electrode and the first side surface outer electrode located on the first side surface;
- a distance in the length direction between the second end surface outer electrode and the first side surface outer electrode located on the first side surface;
- a distance in the length direction between the first end surface outer electrode and the second side surface outer electrode located on the second side surface;
- a distance in the length direction between the second end surface outer electrode and the second side surface outer electrode located on the second side surface;

i is a distance on the side where the distance g is located, out of a distance in the length direction along which the first side surface outer electrode located on the first side surface extends and a distance in the length direction along which the second side surface outer electrode located on the second side surface extends;

L≤about 1.4 mm;
about 1.1≤L/W≤about 1.6;
e≤about 0.10 mm;
i/L>about 0.40; and
i/g>about 2.

2. The multilayer ceramic capacitor according to claim 1, wherein
a thickness in the stacking direction of each of outer layer portions of the multilayer body is about 60 μm or less; the outer layer portions are located at a side of the first main surface and at a side of the second main surface of the multilayer body and include a dielectric layer that is located between the first main surface and an inner electrode that is closest to the first main surface, and a dielectric layer that is located between the second main surface and an inner electrode that is closest to the second main surface.

3. The multilayer ceramic capacitor according to claim 1, wherein
a length of each of side portions of the multilayer body is about 80 μor less; the side portions of the multilayer body are located between one end of the first facing electrode portion of each of the first inner electrodes in the width direction and the first side surface, and between another end of the first facing electrode portion in the width direction and the second side surface; and the side portions of the multilayer body are located between one end of the second facing electrode portion of each second inner electrode in the width direction and the first side surface, and between another end of the second facing electrode portion in the width direction and the second side surface.

4. The multilayer ceramic capacitor according to claim 1, wherein
i is a distance on the side where the distance g is located out of:
- a distance in the length direction of the multilayer body along which the first side surface outer electrode located on the first side surface of the multilayer body extends; and
- a distance in the length direction of the multilayer body along which the second side surface outer electrode located on the second side surface of the multilayer body extends; and a is a distance on the side where the i is located out of:
- a distance in the length direction of the multilayer body along which a leading end of the third extending electrode portion of the second inner electrode extends; and
- a distance in the length direction of the multilayer body along which a leading end of the fourth extending electrode portion of the second inner electrode extends; and i−a≤about 0.3 mm.

5. The multilayer ceramic capacitor according to claim 1, wherein the plurality of dielectric layers are made of at least one of barium titanate, calcium titanate, strontium titanate, barium calcium titanate, or a dielectric ceramic including calcium zirconate, defining a main component.

6. The multilayer ceramic capacitor according to claim 5, wherein the plurality of dielectric layers include a subcomponent including at least one of a Mg compound, a Mn compound, a Si compound, an Al compound, a V compound, or a Ni compound in a smaller content than the main component.

7. The multilayer ceramic capacitor according to claim 1, wherein an average thickness of each of the plurality of dielectric layers in the stacking direction is about 0.5 μm to about 2 μm.

8. The multilayer ceramic capacitor according to claim 2, wherein a thickness of each of the outer layer portions in the stacking direction is about 30 μm to about 60 μm.

9. The multilayer ceramic capacitor according to claim 1, wherein the plurality of first inner electrodes and the plurality of second inner electrodes include Ni, Cu, Ag, Pd or Au, or an alloy containing one of Ni, Cu, Ag, Pd or Au.

10. A multilayer ceramic capacitor mount structure comprising:
the multilayer ceramic capacitor according to claim 1; and
a mounting substrate on which the multilayer ceramic capacitor is mounted; wherein
the mounting substrate includes:
a base portion including a main surface;
a first land and a second land that are located on the main surface of the base portion so as to be spaced apart from each other; and
a third land and a fourth land that are located between the first land and the second land on the main surface of the base portion so as to be spaced apart from each other in a direction that is orthogonal or substantially orthogonal to a direction that connects the first land and the second land;
A is a distance from an end portion of the first land on the opposite side from a side where the second land is located to an end portion of the second land on the opposite side from a side where the first land is located;
B is a distance between the third land and the fourth land; and
C is a distance from an end portion of the third land on the opposite side from a side where the fourth land is located to an end portion of the fourth land on the opposite side from a side where the third land is located;
A is about 1.4-1.6 mm;
B is about 0.3-0.4 mm; and
C is about 0.95-1.1 mm.

11. The multilayer ceramic capacitor mount structure according to claim 10, wherein
a thickness in the stacking direction of each of outer layer portions of the multilayer body is about 60 μm or less;
the outer layer portions being located at a side of the first main surface and at a side of the second main surface of the multilayer body and including a dielectric layer that is located between the first main surface and an inner electrode that is closest to the first main surface, and a dielectric layer that is located between the second main surface and an inner electrode that is closest to the second main surface.

12. The multilayer ceramic capacitor mount structure according to claim 10, wherein
a length of each of side portions of the multilayer body is about 80 μm or less, the side portions of the multilayer body being located between one end of the first facing electrode portion of each of the first inner electrodes in the width direction and the first side surface, and between another end of the first facing electrode portion in the width direction and the second side surface, and the side portions of the multilayer body are located between one end of the second facing electrode portion of each second inner electrode in the width direction and the first side surface, and between another end of the second facing electrode portion in the width direction and the second side surface.

13. The multilayer ceramic capacitor mount structure according to claim 10, wherein
i is a distance on the side where the g is located out of:
a distance in the length direction of the multilayer body along which the first side surface outer electrode located on the first side surface of the multilayer body extends;
a distance in the length direction of the multilayer body along which the second side surface outer electrode located on the second side surface of the multilayer body extends; and
a is a distance on the side where the i is located out of:
a distance in the length direction of the multilayer body along which a leading end of the third extending electrode portion of the second inner electrode extends; and
a distance in the length direction of the multilayer body along which a leading end of the fourth extending electrode portion of the second inner electrode extends; and
i−a≤about 0.3 mm.

14. The multilayer ceramic capacitor mount structure according to claim 10, wherein the plurality of dielectric layers are made of at least one of barium titanate, calcium titanate, strontium titanate, barium calcium titanate, or a dielectric ceramic including calcium zirconate, defining a main component.

15. The multilayer ceramic capacitor mount structure according to claim 14, wherein the plurality of dielectric layers include a sub-component including at least one of a Mg compound, a Mn compound, a Si compound, an Al compound, a V compound, or a Ni compound in a smaller content than the main component.

16. The multilayer ceramic capacitor mount structure according to claim 10, wherein an average thickness of each of the plurality of dielectric layers in the stacking direction is about 0.5 μm to about 2 μm.

17. The multilayer ceramic capacitor mount structure according to claim 11, wherein a thickness of each of the outer layer portions in the stacking direction is about 30 μm to about 60 μm.

18. The multilayer ceramic capacitor mount structure according to claim 10, wherein the plurality of first inner electrodes and the plurality of second inner electrodes include Ni, Cu, Ag, Pd or Au, or an alloy containing one of Ni, Cu, Ag, Pd or Au.

* * * * *